Aug. 3, 1954     S. C. KERSHAW     2,685,338
MACHINE FOR SLITTING BANDAGE MATERIAL
Filed March 29, 1952
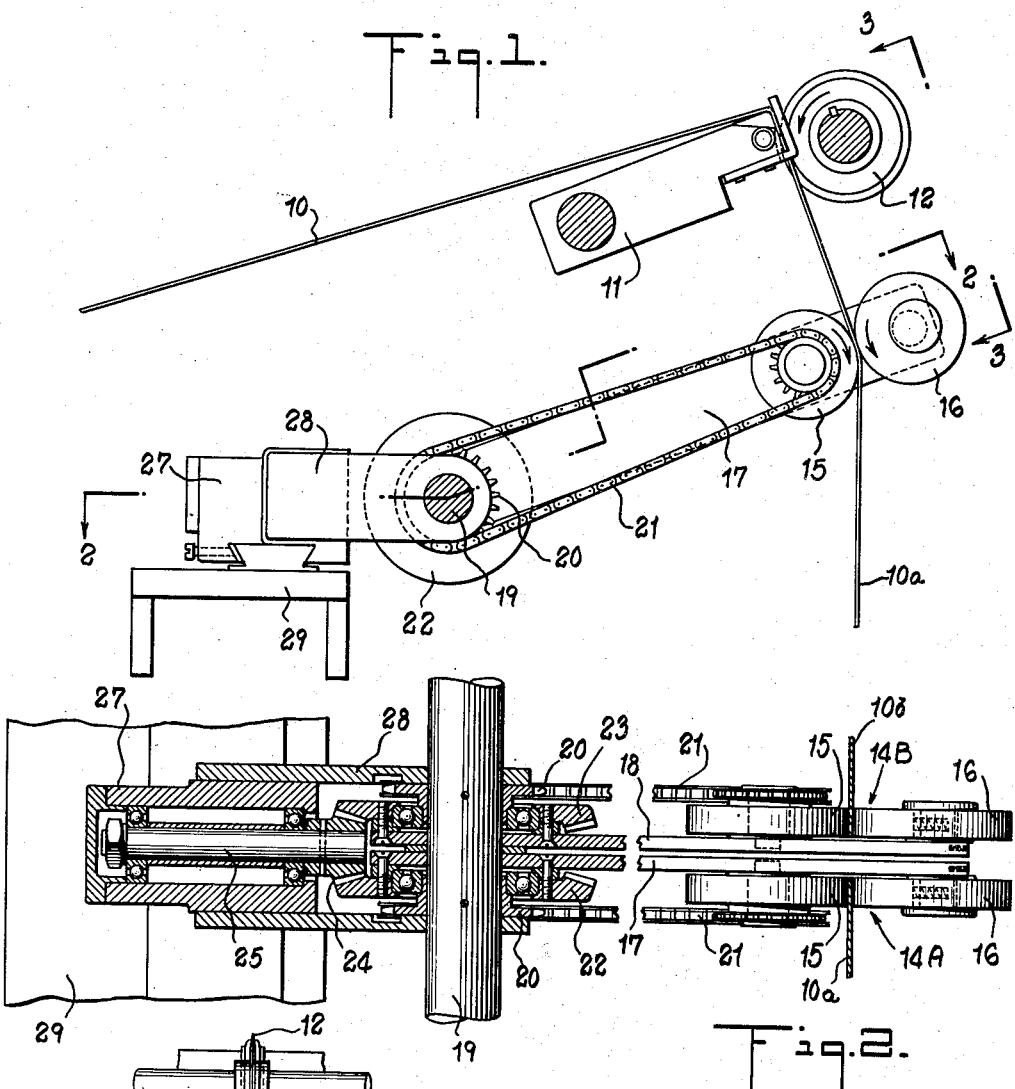
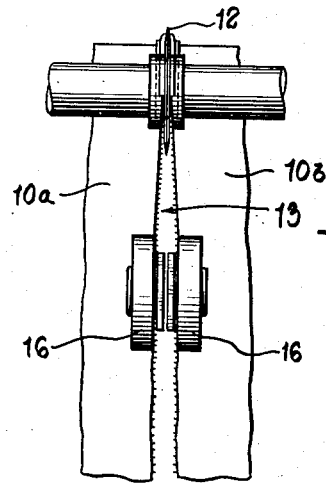
INVENTOR.
STANLEY C KERSHAW
BY
HIS ATTORNEYS Patented Aug. 3, 1954

2,685,338

UNITED STATES PATENT OFFICE 2,685,338

MACHINE FOR SLITTING BANDAGE MATERIAL

Stanley C. Kershaw, Saylesville, R. I., assignor to Coats & Clark Inc., a corporation of Delaware Application March 29, 1952, Serial No. 279,419

9 Claims. (Cl. 164—61)

1

The present invention relates to improvements in a machine for slitting bandage material and relates more particularly to a machine for slitting elastic bandage material into bandages of the desired width.

An object of the present invention is to provide a bandage slitting machine wherein an equalized tension is maintained on both sides of the material being cut between the point at which the material is cut and the point from which the material is pulled to draw it over a cutting knife. This will keep the material running true with respect to the cutting knife and the cut will extend along a straight line running lengthwise of the material. This is especially important in elastic bandage material where differences in the elasticity of the material may create a greater pull in one side of the material than the other with the result that the cut will run off center.

Other objects and advantages of the invention will be apparent and best understood from the following description and the accompanying drawings in which:

Fig. 1 is a side view in partial section of a machine for slitting bandage material which embodies the invention;

Fig. 2 is a section view taken along the line 2—2 of Fig. 1; and

Fig. 3 is an end view of the machine as seen from the line 3—3 of Fig. 1.

Referring now to the drawings in detail, a length of bandage material 10 is fed from a roll or other supply (not shown) over a cutting guide 11.

A rotary cutting knife 12 engages with and cuts the bandage material into two portions 10a and 10b of the desired bandage width along a line 13 extending lengthwise of the material as the material is drawn over the guide 11 and past the knife 12. As is customary in certain types of bandage material, the portions 10a and 10b may be produced in such a way that they are separated by a pair of spaced lenos with pick threads extending between the lenos. The distance between the lenos is generally about ⅛ of an inch and the pick threads should be cut at their centers so as to avoid damaging or cutting the lenos.

It should also be understood that although only two portions 10a and 10b of the bandage material are referred to herein, there may be a number of similar portions extending across the width of the material with a cut being made in a similar manner between the adjoining portions of the material.

The severed portions 10a and 10b of the material pass between sets of draw rolls 14A and 14B and the material 10 is drawn past the cutting knife 12 by the operation of the draw rolls. Each set of draw rolls consists of a rubber covered roll 15 and a spring backed nip roll 16 which is biased to hold the material in engagement with the rubber covered roll 15. The sets of rolls 14A and 14B are supported at the outer ends of arms 17 and 18, respectively. The arms 17 and 18 are pivoted on and are rotatable about a drive shaft 19. Sprockets 20 are secured to the drive shaft and drive the rubber covered rolls 15 through chains 21.

The pivoted arms 17 and 18 are connected together by gears in such a way that movement of one of the arms in one direction is transmitted to the other arm and results in the same movement of the other arm but in the opposite direction. In the illustrated embodiment of the invention, the arms 17 and 18 are attached to bevel gears 22 and 23, respectively, which are also mounted on and are rotatable about the drive shaft 19 on which the arms are pivoted. The bevel gears 22 and 23 face in opposing directions and are connected together through a bevel gear 24.

The bevel gear 24 is mounted on a shaft 25 which is supported on ball bearings in a frame 27 forming part of a bracket 28 in which the drive shaft 19 is journalled. Ball bearings are employed in supporting the shaft 25, the bevel gears 22 and 23 and the arms 17 and 18 to make the unit as sensitive as possible to changes in tension in the portions 10a and 10b of the material being slit.

It should also be noted that the bracket 28 is slidably mounted on a supporting frame 29 so that the mechanism can be readily moved to accommodate various widths of bandages. It will also be understood that other types of gearing, such as ordinary spur gears, may be used to connect the arms 17 and 18, but the use of bevel gears conserves space.

In operation, the rolls 15, which are rubber covered, are driven from the shaft 19 through chains 21 and draw the material 10 over the guide 11 into cutting engagement with the cutting knife 12. Should the relative tension in the two sides of the material extending between the two sets of rolls 14A and 14B and the point of cutting change, the arms 17 and 18 on which the rolls are mounted will pivot about the shaft 19 in opposite directions through the action of the gears 22, 23 and 24 and as a result thereof, the tension in the two sides of the material will be equalized. For example, if the portion 10a on left side of the cut (as viewed from the right end of Fig. 2) happens to have more elasticity than the portion 10b on the right side of the cut, a greater tension will be set up between the rolls and the cutting knife in right side of the material. As a result of this difference in tension, the right-hand set of rolls 14B will move upwardly or toward the cutting knife and the left-hand rolls 14A will move downwardly or away from the cutting knife until the tension in the two sides 10a and 10b of the material is equalized. Thus, an equal pull or tension, which keeps the material 10 running true with respect to the cutting knife 12, is automatically maintained in both sides of the material between the rolls and the point of cutting.

It will be understood that various modifications and changes may be made in the embodiment of the invention illustrated and described herein without departing from the scope of the invention as defined by the claims as appended hereto.

I claim:

1. In a machine for slitting bandage material, the combination of a cutting knife, said knife being positioned to engage with and cut a length of bandage material into two portions along a line extending lengthwise of the material, a pair of pivoted arms, means on each of the arms for moving the material lengthwise with respect to the knife, said means on the respective arms engaging with one of the cut portions of the material and means connecting the pivoted arms together for transmitting movement in one direction of one of the arms to the other of the arms in an opposite direction.

2. In a machine for slitting bandage material, the combination as defined in claim 1 wherein the means connecting the pivoted arms includes a bevel gear secured to each of the arms and a bevel gear engaging with and connecting the bevel gears secured to the pivoted arms.

3. In a machine for slitting elastic bandage material, the combination of a knife, said knife being positioned for engagement with a length of bandage material to sever said material into two portions along a line extending lengthwise thereof, a set of rolls engaging with each of the severed portions of the bandage material, means for driving said rolls and drawing the bandage material lengthwise over the knife in cutting engagement therewith, an arm supporting each of said sets of rolls, said arms being pivoted about a common center and permitting movement of the rolls in a lengthwise direction with respect to the bandage material and means connecting said arms for transmitting movement in one direction of one of the arms to the other of said arms in an opposite direction.

4. In a machine for slitting elastic bandage material, the combination as defined in claim 3 wherein the means connecting the arms includes a bevel gear secured to each of the arms and a bevel gear engaging with and connecting the bevel gears secured to the pivoted arms.

5. In a machine for slitting a length of elastic bandage material into two portions along a line extending lengthwise thereof, the combination of a pair of pivoted arms, said arms being pivoted about a common center, means carried by each of the arms for drawing the bandage material lengthwise with respect to a cutting knife and in cutting engagement therewith, said means on the respective arms engaging with one portion of the bandage material and means connecting the pivoted arms together for transmitting movement in one direction of one of the arms to the other of the arms in an opposite direction.

6. In a machine for slitting a length of elastic bandage material into two portions along a line extending lengthwise thereof, the combination as defined in claim 5 wherein the means connecting the pivoted arms includes a bevel gear secured to each of the arms and a bevel gear engaging with and connecting the bevel gears secured to the pivoted arms.

7. In a machine for slitting a length of elastic bandage material along a line extending lengthwise thereof, the combination of a drive shaft, a pair of arms pivotally supported at one end thereof on said drive shaft, a set of rolls carried at the other end of each of said arms, each of said sets of rolls engaging with a severed portion of a length of elastic bandage material to draw the material lengthwise over a cutting knife, driving connections from each of said sets of rolls to the drive shaft, a bevel gear secured to each of the pivoted arms, said gears being movable with the arms about the drive shaft and a bevel gear engaging with and connecting the bevel gears secured to the pivoted arms.

8. A machine for slitting bandage material wherein a knife engages with and cuts the material along a line extending lengthwise thereof, that is characterized by means engaging with severed portions of a bandage material for drawing the material lengthwise over a cutting knife, movable members supporting each of said means and gears connecting said movable members, said gears transmitting movement in one direction of one of said supporting members to another of said members in an opposite direction.

9. A machine for slitting bandage material into two portions of a desired width wherein a knife engages with and cuts the material along a line extending lengthwise of the material that is characterized by two sets of draft rolls, each set of said rolls engaging with a severed portion of the bandage material for drawing the material over a cutting knife, members movably supporting each of the sets of rolls and gearing connecting said members, said gears transmitting movement in one direction of one of said members to the other of said members in an opposite direction.

References Cited in the file of this patent

UNITED STATES PATENTS

| Number | Name | Date |
|---|---|---|
| 552,947 | Williams | Jan. 14, 1896 |
| 1,894,850 | Carlson | Jan. 17, 1933 |
| 2,094,987 | Klahre | Oct. 5, 1937 |
| 2,170,289 | Klingler | Aug. 22, 1939 |
| 2,576,204 | Allen | Nov. 27, 1951 |